United States Patent [19]

Weisbrod

[11] 3,917,980

[45] Nov. 4, 1975

[54] PROTECTION CIRCUIT

[75] Inventor: Sherman Weisbrod, Trenton, N.J.

[73] Assignee: RCA Corporation, New York, N.Y.

[22] Filed: May 20, 1974

[21] Appl. No.: 471,555

[52] U.S. Cl. ................ 317/33 VR; 317/31; 317/16; 323/22 T; 323/18; 307/297; 331/186

[51] Int. Cl.[2] ....................... H02H 3/08; H02H 7/20

[58] Field of Search ...... 317/31, 33 VR, 16; 323/17, 323/18, 22 T; 307/202, 297; 331/109; 321/2

[56] References Cited

UNITED STATES PATENTS

| | | | |
|---|---|---|---|
| 3,366,871 | 1/1968 | Connor | 317/31 X |
| 3,386,005 | 5/1968 | Roland et al. | 317/31 X |
| 3,419,789 | 12/1968 | Gately | 323/22 T |
| 3,571,608 | 3/1971 | Hurd | 317/31 X |
| 3,629,622 | 12/1971 | Denenberg | 323/22 T X |
| 3,675,158 | 7/1972 | Judd et al. | 323/22 T X |
| 3,733,540 | 5/1973 | Hawkins | 323/22 T |
| 3,754,182 | 8/1973 | Morris et al. | 323/22 T X |
| 3,809,999 | 5/1974 | Smith | 323/17 |
| 3,835,368 | 9/1974 | Williams | 323/17 |

*Primary Examiner*—J. D. Miller
*Assistant Examiner*—Patrick R. Salce
*Attorney, Agent, or Firm*—H. Christoffersen; S. Cohen

[57] ABSTRACT

A switching circuit connected between a power supply and a load such as a trapatt diode amplifier. The amplifying element is protected from destruction, in the event that the amplifier should break into oscillation. Two serially connected monostable multivibrators control the conduction state of a transistor whose collectoremitter conduction path is in series with the amplifier, thereby limiting the peak, steady-state and average power that the power supply can deliver.

7 Claims, 2 Drawing Figures

PROTECTION CIRCUIT

Figure 1:
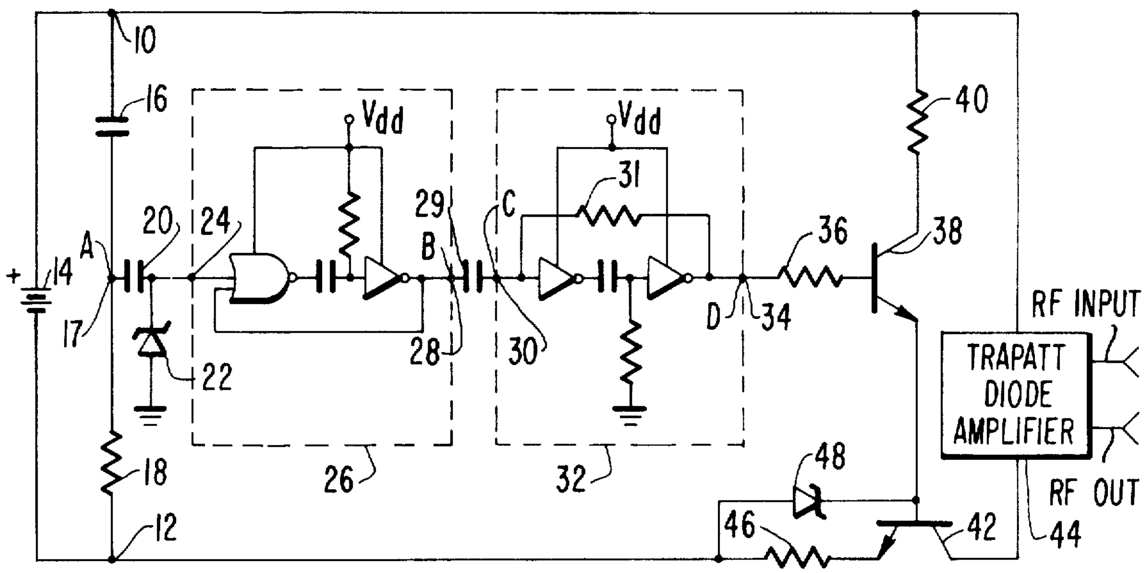

A pulsed trapatt diode amplifier requires a dc power supply having a low impedance. The diode is quiescently biased near its breakdown voltage, where the current drawn is in the microampere range. When a pulsed input signal is applied to the amplifier, the diode switches to a low impedance state, causing the dc current to increase to several amperes.

While a trapatt diode amplifier is being tuned to a desired frequency response, or upon initial application of dc power, a danger exists that the amplifier may begin to oscillate. Since the power supply is dc and has a low impedance, the amplifier may continue to oscillate, drawing currents sufficient to destroy the diode.

The circuit of the present invention provides overcurrent protection for a load, such as a trapatt diode amplifier, in response to an increase in current drawn by the load. A switch, having its conduction path serially connected between one terminal of the load and one terminal of a source of operating voltage, has its conduction path maintained in a low impedance condition for a given interval of time after the current increase. The conduction path is then maintained at a high impedance level for a second interval of time after which time, the conduction path impedance is switched back to a low level.

Figure 2:
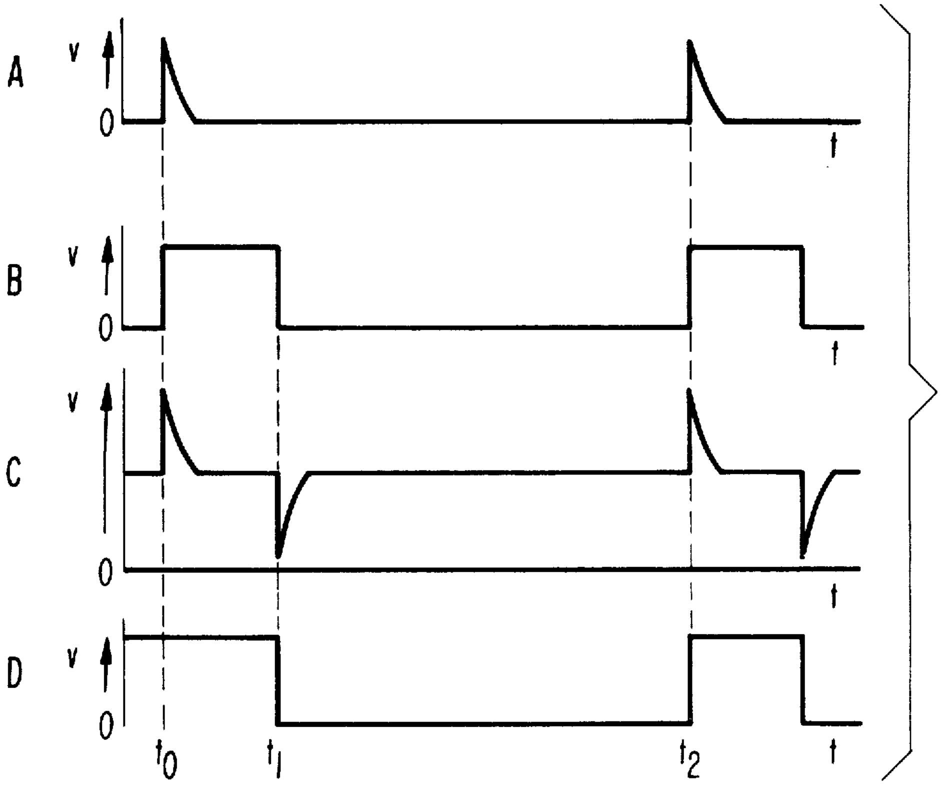

The invention is discussed in greater detail below and illustrated in the drawing of which:

FIG. 1 is a schematic circuit diagram of a preferred embodiment of the invention; and FIG. 2 illustrates waveforms present in the circuit of FIG. 1.

The circuit of FIG. 1 includes a dc power supply, shown as a battery 14, having a pair of output terminals 10, 12. A capacitor 16 and resistor 18 are serially connected between these terminals. Capacitor 20 is connected from point 17 to the cathode of zener diode 22 and to the input terminal 24 of monostable multivibrator 26. The anode of diode 22 is connected to ground.

The output terminal 28 of the multivibrator is connected through capacitor 29 to input terminal 30 of monostable multivibrator 32. The output terminal 34 of multivibrator 32 connects through resistor 36 to the base electrode of transistor 38. The collector electrode of this transistor connects through resistor 40 to terminal 10, while its emitter electrode is connected to the base electrode of transistor 42. The collector electrode of transistor 42 connects to one power supply terminal of trapatt amplifier 44 while its emitter electrode is connected through resistor 46 to terminal 12. The other power supply terminal of amplifier 44 is connected to terminal 10. The anode of zener diode 48 is connected to terminal 12 while its cathode is connected to the base electrode of transistor 42.

In the operation of the circuit of FIG. 1, assume initially that amplifier 44 is not oscillating and no input signal is being applied to the RF input terminal. Under these conditions, quiescent current flows through amplifier 44 between terminals 10 and 12. The amplifier is biased such that this current is quite small, generally on the order of several microamperes. Capacitor 16 is charged to the power supply voltage and point 17 is at the potential of power supply return terminal 12. The output of multivibrator 26 will be essentially zero volts. This voltage level is defined as a logical zero for this application. At the same time, the output voltage of multivibrator 32 is a positive value defined as a logical one.

A logical one at terminal 34 causes a flow of base current through transistor 38 and this, in turn, causes collector current to flow through transistor 38. Current thereby flows into the base electrode of transistor 42, turning this transistor to its conducting state and permitting amplifier current to flow through its collector circuit.

If the current flow to the amplifier increases significantly because, for example, it has begun to oscillate, capacitor 16 momentarily discharges through transistor 38 and amplifier 44. It then recharges to the power supply potential. The decrease in potential across capacitor 16 results in a relatively rapid increase in the voltage amplitude at point 17. This voltage then decays towards zero volts as capacitor 16 recharges. The discharge and subsequent recharging of capacitor 16 produces a positive voltage pulse at point 17, shown at A of FIG. 2. This pulse is coupled by capacitor 20 to terminal 24, thereby triggering multivibrator 26. Zener diode 22 is present to prevent damage, due to excessive pulse amplitude, to the input circuit of this multivibrator.

In response to the pulse A, multivibrator 26 produces a pulse at a logical one level for the interval $t_0$–$t_1$, as shown at B of FIG. 2. This voltage pulse is differentiated by resistor 31 within multivibrator 32 and capacitor 29 to produce at terminal 30 the voltage waveform shown at C of FIG. 2. Multivibrator 32 responds to the negative one of these pulses which occurs at time $t_1$ and in response thereto, produces an output pulse D at the logic 0 level and of a duration $t_1$–$t_2$. This negative pulse turns off transistor 38, thus interrupting the flow of base current to transistor 42, turning off transistor 42. When transistor 42 cuts off, the flow of current to amplifier 40 terminates.

At time $t_2$, the potential at terminal 34 returns to the logical one level, turning transistors 38 and 42 on thereby permitting current flow through amplifier 44. If the amplifier oscillated as soon as dc power was reapplied, a condition shown at $t_2$ of FIG. 2, the abovedescribed timing cycle would repeat and continue to repeat for as long as oscillations continue. If not, then capacitor 16 would remain charged to the battery voltage and no pulse A would occur at time $t_2$.

By permitting large values of current to flow through amplifier 44 for an interval not greater than $t_0$–$t_1$, damage to the trapatt diode from excessive steady state power is prevented. The $t_0$–$t_1$ interval is chosen to be less than the maximum safe pulse width for a given diode. The interval $t_1$–$t_2$ is chosen such that the duty cycle over the interval $t_0$–$t_2$ is below the maximum safe duty cycle for the diode.

The diode is protected from damage due to excessive peak power by the current limiting circuit comprising zener diode 48, resistor 46 and transistor 42. The maximum load current is limited to the breakdown voltage of diode 48 minus the base-emitter voltage drop of transistor 42, this voltage divided by the resistance of resistor 46.

The above-described circuit responds, upon application of an RF input signal, in the same manner as it does to amplifier oscillation. In normal operation of the amplifier the time interval $t_0$–$t_1$ is chosen to be equal to or slightly greater than the pulse width of the input signal. Protection is thereby provided against input signals whose pulse width, duty cycle or peak amplitude could damage the amplifier.

What is claimed is:

1. An overcurrent protection circuit for a load having two terminals comprising, in combination:

first and second terminals for an operating voltage, the load being connected at one of its terminals to said first terminal;

a first switch having a control electrode and a conduction path, said conduction path connected between the other terminal of said load and said second terminal;

a second switch having a conduction path and a control electrode, said conduction path connected between said first terminal and the control electrode of the first switch;

means for normally applying to the control electrode of said second switch a control signal at a first level to cause conduction through the second switch at a level to maintain the conduction path impedance of the first switch at a relative low level; and means including a differentiator and also the means set forth above, responsive to a rate of change of current of greater than a given value drawn by said load for maintaining the control signal at the control electrode of said second switch at said first level for a given interval of time, then switching said control signal to a second level for a second interval of time, at which second level the impedance of the conduction path of said second switch is switched to a relatively high impedance level, whereby the impedance of the conduction path of said first switch is switched to a relatively high impedance, then switching said control signal back to said first level.

2. The combination recited in claim 1 wherein said first and second switches comprise first and second bipolar transistors, each transistor having base, collector and emitter electrodes, said first transistor base electrode comprising said first switch control electrode, said first switch conduction path comprising the path between said first transistor, collector and emitter electrodes, said second transistor base electrode comprising said second switch control electrode and said second switch conduction path comprising the path between said second transistor, collector and emitter electrodes.

3. A circuit as set forth in claim 2, further including means responsive to the amplitude of current flowing through said second transistor for preventing the current through said second transistor from exceeding a given amplitude comprising:

an impedance; and a zener diode, said diode having a cathode and an anode, said impedance coupled between the emitter electrode of said second transistor and said anode and said cathode coupled to the base electrode of said transistor.

4. The combination recited in claim 1 wherein said means for causing conduction through said second switch comprises a first monostable multivibrator, said multivibrator having an output signal terminal and an input trigger terminal, said output signal coupled to said second switch control electrode, whereby, in the absence of a trigger at said input terminal, conduction is maintained through said second switch.

5. The combination recited in claim 1 wherein said means for maintaining the control signal at said first level for a given interval of time then switching said signal to a second level for a second interval of time comprises a second multivibrator having an output signal terminal and an input trigger terminal, said output terminal coupled to the input terminal of said first multivibrator and said input terminal coupled to said means responsive to the rate of change of current whereby said second multivibrator, in response to said rate of change, produces a first pulse having a duration equal to said first interval and said first multivibrator, in response to the termination of said first pulse produces a second pulse having a duration equal to said second interval thereby maintaining said second switch at said first level for the first interval of time and maintaining said switch at the second level for said second interval of time.

6. The combination recited in claim 5 wherein said means responsive to the rate of change of current comprises a capacitor and a resistor, said capacitor and resistor serially connected across said first and second operating voltage terminals.

7. The combination recited in claim 5 further including means for preventing damage to said second multivibrator due to the application of signals of excessive amplitude to said input terminal comprising a zener diode connected between said input terminal and a point at a reference potential.

* * * * *